United States Patent [19]
De Villepoix et al.

[11] Patent Number: 5,655,752
[45] Date of Patent: Aug. 12, 1997

[54] SYSTEM WITH IMPERVIOUSNESS JOINT COMPRESSED BETWEEN TWO NON-PARALLEL BEARINGS

[75] Inventors: Raymond De Villepoix, Donzere; Christian Rouaud, Bourg Saint-Andeol, both of France

[73] Assignee: Commissariat a l'Energie Atomique, France

[21] Appl. No.: 478,989

[22] Filed: Jun. 7, 1995

[30] Foreign Application Priority Data

Jun. 10, 1994 [FR] France .................................. 94 07143

[51] Int. Cl.$^6$ ................................................. F16K 1/22
[52] U.S. Cl. ................... 251/359; 251/174; 251/357; 251/358
[58] Field of Search ....................... 251/359, 357, 251/358, 174, 176

[56] References Cited

U.S. PATENT DOCUMENTS

| | | | |
|---|---|---|---|
| 1,427,680 | 8/1922 | English . | |
| 3,077,332 | 2/1963 | Burtis | 251/174 |
| 3,199,833 | 8/1965 | Skinner, Jr. | 251/176 |
| 4,258,901 | 3/1981 | Zinnai et al. | 251/174 |
| 4,296,915 | 10/1981 | Baumann | 251/174 |
| 4,658,847 | 4/1987 | McCrone | 251/174 |
| 5,178,364 | 1/1993 | Garrigues et al. | 251/174 |
| 5,249,774 | 10/1993 | Mazel et al. | 251/174 |

FOREIGN PATENT DOCUMENTS

| | | |
|---|---|---|
| 2253170 | 6/1975 | France . |
| 1325997 | 8/1973 | United Kingdom . |
| 84/00058 | 1/1984 | WIPO . |

*Primary Examiner*—A. Michael Chambers
*Attorney, Agent, or Firm*—Londa and Traub LLP

[57] ABSTRACT

Imperviousness system composed of a metallic toric joint (9) compressed between two bearings (27, 28) which together form an acute angle ($\alpha$) so as to produce a sliding and polishing of the skin of the joint and reduce the local levellings which would compromise the imperviousness capacity of the joint on each closing operation.

15 Claims, 5 Drawing Sheets

5,655,752

SYSTEM WITH IMPERVIOUSNESS JOINT COMPRESSED BETWEEN TWO NON-PARALLEL BEARINGS

FIELD OF THE INVENTION

The invention concerns an imperviousness system including in particular a joint compressed between non-parallel bearings.

BACKGROUND OF THE INVENTION

To date, there are many devices able to periodically re-establish imperviousness between two elements via the repetition of a relative movement of two mechanical pieces which clamp a gasket and in particular slide valves, clack valves, cocks and inspection doors with periodical opening and closing. In some of these devices, the gasket is metallic and elastic and is compressed between bearings made of an identical or different metal. Certain criteria, such as fire-resistance, a high working temperature and the need to obtain a high vacuum, may in fact impose that other materials be excluded.

SUMMARY OF THE INVENTION

A conventional cock system is described and shown on FIG. 1. This figure shows a cock body 1 associated with a control member 2 engaged in a sleeve 3 of the body 1 and which in particular includes an operating rod 4 controlled by an external flywheel 5. The operating rod 4 is ended at the other end by a clack valve 6 orientated towards a seat or valve body portion 7 and equipped with a gasket or plubing element 9, also known as a clack valve joint.

The seat 7 belonging to the body 12 is situated inside the latter at the junction point of two pipe segments 10 and 11 which each end at flanges 12 and 13 to the extremities of the body 1 to which pipework may be connected.

A mechanical device, such as a nut/screw link between the operating rod 4 and the flywheel 5 and a wedge between the operating rod 4 and the body 1 makes it possible to convert the rotation of the flywheel 5 into an axial movement of the operating rod 4 and of the clack valve 6 which may move forwards towards the seat 7 until the joint 9 is compressed between one bearing 14 of the seat 7 and one bearing 15 of the clack valve 6. Communication between the two elements formed by the pipe segments 10 and 11 is then interrupted but may be re-established via an inverse movement of the clack valve 6. Finally, stacked elastic washers 8 disposed between the body 1 and a shoulder of the flywheel 5 push the latter back towards the seat and generally keep it in a uniform position.

Amongst existing joints able to be compressed between two metallic elements, toric-shaped elastic metallic gaskets are retained for the present invention, although this particular selection is given solely by way of non-restrictive example, said gaskets including a metallic core constituted by a helical spring with contiguous spires enclosing itself to form a circle, and at least one metallic outer casing in which the metallic core is embedded and having a C-shaped or ring-shaped section. When this type of joint is compressed between two flanges or bearings, it can be identified by virtue of its force characteristic as a function of crushing, an example of this being given in FIG. 2. Compression starts with a fully rectilinear curved portion 20, namely that crushing is proportional to the force and continues by a portion expressing a least resistance of the joint, namely an increase of a weaker force produces more significant crushing. In practice, the compression of the joint 9 stops according to the resistance provided by the elastic washers 8 in the operating rod 4/flywheel 5 system: in turn, they also buckle and are crushed in undergoing a specific force. The decompression curve 22 of the joint 9 is produced with hysteresis allowing a significant residual crushing to exist after removal of the joint 9 from the bearing of the seat 14. The next compression of the joint 9 shall be effected along a curve 23 more or less parallel to the first compression curve 20 and 21, but it shall be observed that the force Y2 required to re-establish imperviousness is much greater than the force Y1 which would suffice on the first occasion. It can be seen that the same would apply for each subsequent use, which means that a metallic toric joint as defined above cannot be used for a long period of time so as to renew imperviousness between the two bearings 14 and 15 as the force required to re-establish imperviousness would exceed the force able to be applied at the end of a few manoeuvres.

It is to be noted that the evolution of the force for creating imperviousness Y follows a linear progression 24 with respect to the logarithm of the number of manoeuvres of the clack valve 6 (FIG. 4) for the joint 9 clamped between the two parallel bearings 14 and 15 (FIG. 3).

To find a way out to this persistent increase of the imperviousness force threshold on each new usage, the present invention proposes to change the respective disposition of the bearings of the seat 7 and the clack valve 6. More specifically, they shall collectively form an acute angle.

BRIEF DESCRIPTION OF THE DRAWINGS

There now follows a more detailed description of the principle and embodiments of the present invention accompanied by the following figures given by way of non-restrictive illustration.

DETAILED DESCRIPTION OF THE PREFERRED EMBODIMENTS

Figure 1:
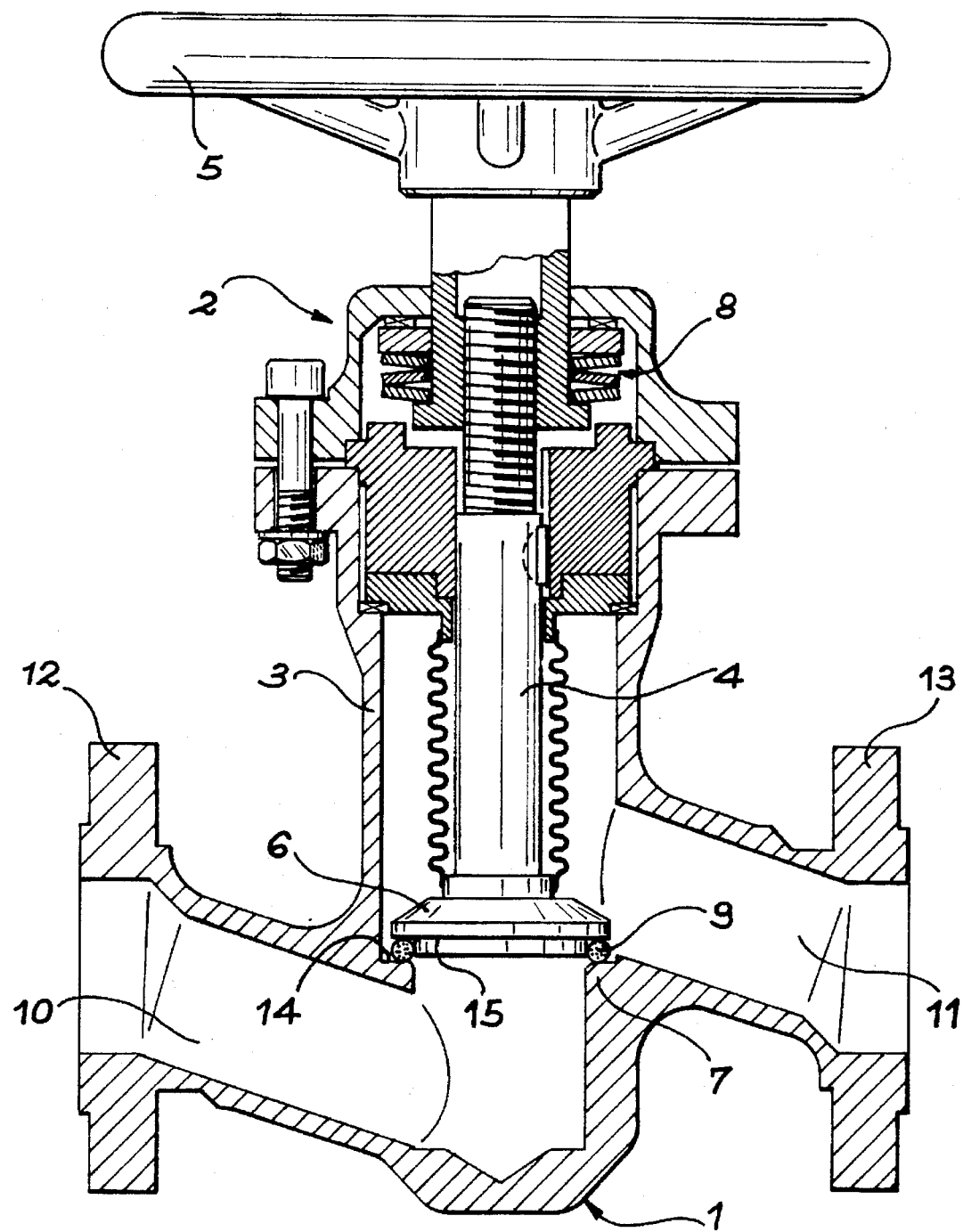
FIGS. 1 and 2, already described, illustrate an imperviousness system and the characteristic crushing curve of a joint, FIG. 3, already described, represents the basic elements of conventional imperviousness systems, FIG. 4, already described, illustrates the degradation of the aptitude of conventional imperviousness systems when carrying out their particular task.
Figure 2:
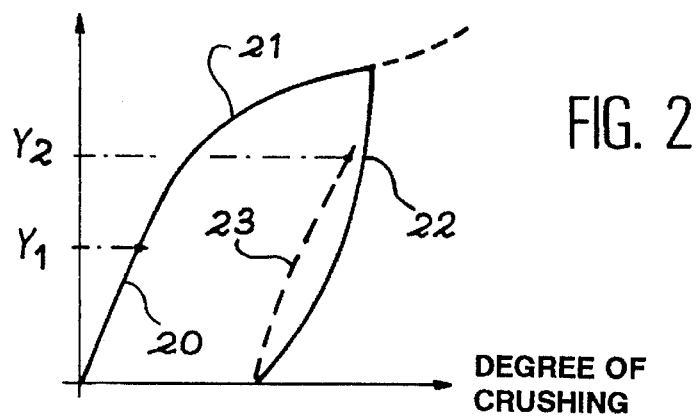
Figure 3:
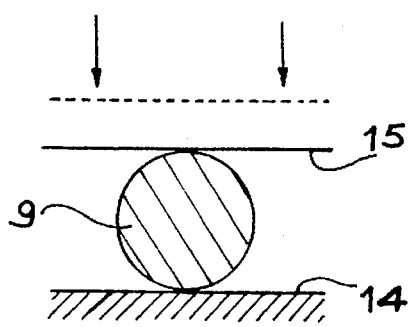
Figure 4:
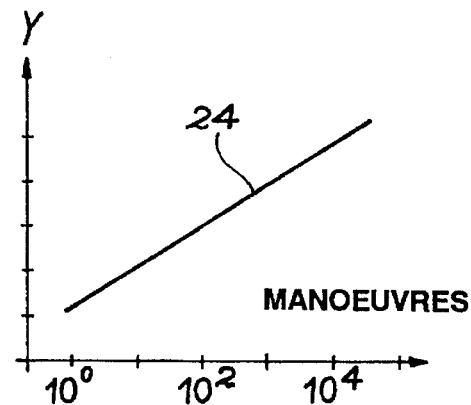
Figure 5:
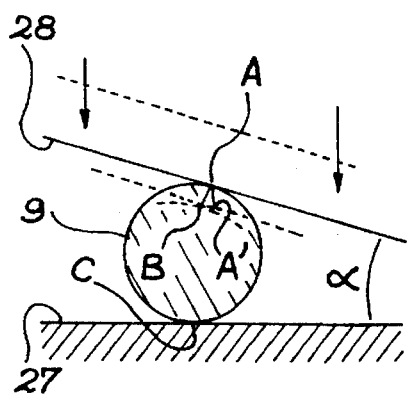
FIG. 5 shows in correspondence with FIG. 3 the basic elements of the imperviousness systems in accordance with the invention, in correspondence with FIG. 4.

First of all (FIG. 5), reference is made to the same joint 9 compressed between a fixed flat face 27 and a mobile conical face 28 forming between then an acute angle $\alpha$. This characteristic makes it possible to avoid the joint 9 being hammered on each compression accompanied by a local plastic crushing levelling the hammered facets and unceasingly widening the contact zone of the joint together with the imperviousness bearings on account of the opening and closings of the clack valve 6. In fact, the initial contact point A of the conical bearing 28 with the represented section of the joint 9 is not diametrically opposite the contact point C with the flat face 27 and shall move at A' parallel to the displacement direction of the conical bearing 28 at the time it moves via a height AA' with as a corollary a crushing of the adjacent portion of the joint 9 which means that the initial contact point A shall move towards the point B a short distance away from the new contact point A' As a result, the joint 9 and the conical bearing 28 slide onto each other by a length BA' equal to AB·tgα, or AA'·sin α and thus fully determined.

Figure 6:
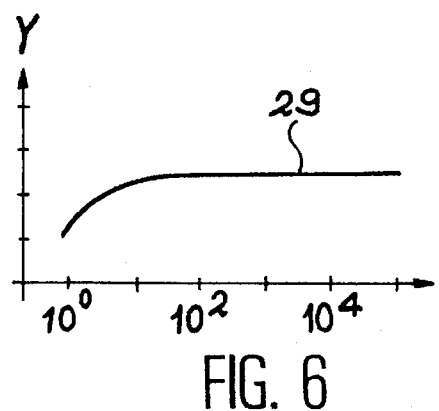
FIG. 6 illustrates the preservation of the aptitude of the imperviousness systems in accordance with the invention when fulfilling their particular task.

This sliding produces modifications on a microgeometrical scale of the surface of the joint which can be compared with a polishing which is maintained with the repetition of clamping and unclampings. It is to be noted that in these circumstances, in accordance with the curve 29 of FIG. 6, the force required to establish imperviousness stabilises between ten and one hundred manoeuvres. It ought to be mentioned that the surface roughness of the conical imperviousness face 28 needs to be able to favor polishing, namely that it needs to be neither too fine nor thick and can be situated around 0.5 to 1 μm of height of the relief unevenness. The joint 9 also needs to be sufficiently smooth and exhibit a surface state free from defects, such as those which often appear on laminated plates used in the production of joints with thin casings. This result may be easily obtained by relatively current production methods, such as flow turning or circular burnishing carried out at the end of production, or even by a surface treatment, such as a plasma electrochemical depositing or vapor phase physical depositing. This overall behaviour is valid, irrespective of the nature of the metal forming the outer skin of the metallic joint and in particular metals such as aluminium, silver, copper, nickel or stainless steel. In order to favor and maintain polishing, it shall suffice to correctly select the clamping force of the joint which shall remain constant, and in particular the angle α so as to take account of the crushing of the joint 9 on each manoeuvre which depends directly on the ductibility of this metal.

For less ductile metals, the value AB is smaller with a constant force which makes it necessary to increase the angle α so as to re-establish the sliding length BA'.

Table I gives experimental results carried out over one thousand manoeuvres for imperviousness levels measured with helium of between $10^{-10}$ to $10^{-8}$ Pa.m³/s/m.

TABLE I

| Type of joint covering | CONSTANT FORCE Y (daN/cm of length of joint) | α |
| --- | --- | --- |
| Aluminum | 80 to 120 | 10 to 15° |
| Silver | 80 to 120 | 20 to 30° |
| Copper | 90 to 130 | 25 to 35° |
| Nickel | 100 to 140 | 30 to 40° |
| Stainless steel | 120 to 150 | 35 to 45° |

This polishing effect is not produced with the flat compression bearing 27 of the joint 9. Indeed, the joint 9 may be disposed between two conical bearings so as to ensure complete imperviousness by the joint 9 alone, but it is not always possible to choose the shape of the bearings and the mounting of the joint 9 on a flat bearing, such as 27, is more stable. The action of the joint 9 is then completed by a static joint which may be partially formed by an elongation of the outer casing of the toric joint in the form of a plain tongue. The main joint or sliding joint shall therefore be compressed between the clamping bearings of the seat and shall ensure imperviousness against the conical bearing, whereas the gasket shall be compressed between the flat bearing and a clamping element connected to the element bearing the flat bearing and shall ensure imperviousness against the flat bearing.

This particular situation is advantageous in that it embodies a strict association between the two joints which is shown on the other figures to be described as follows.

Figure 7:
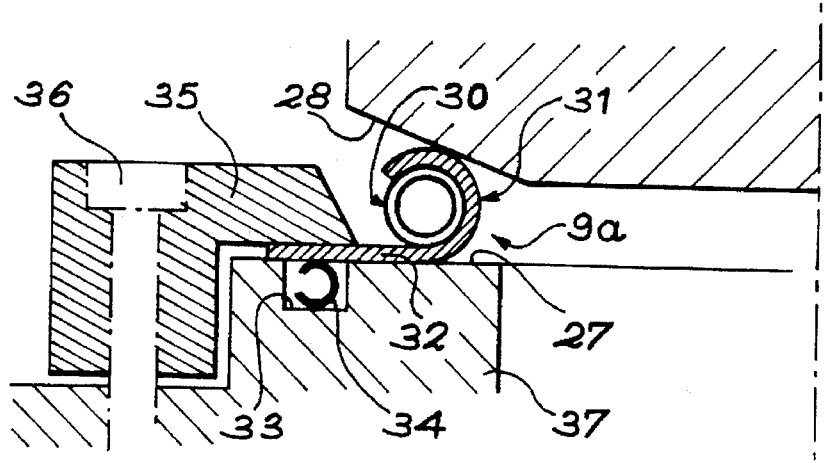
FIGS. 7 to 14 illustrate eight embodiments of the invention.

FIG. 7 shows a joint 9a compressed between the bearings 27 and 28 and, as said earlier, is composed of an internal core 30 formed of the spires of a spring and a casing 31 open towards the outside which surrounds the core 30 via the top (on the side of the conical bearing 28), via the internal face and via the bottom (on the side of the flat bearing 27) and which is extended outwardly into a flat tongue 27 and which receives a second joint 34, possibly metallic and being of the same type or different.

A flange 35, solidly fixed by screws 36 to the seat 37, presses the tongue 32 against the flat bearing 27 (which belongs to the seat 37) and compresses the second joint 34 in its throat 33 by means of the tongue 32. The second joint 34 ensures the imperviousness of the system between the tongue 32 and the flat bearing 27.

Figure 8:
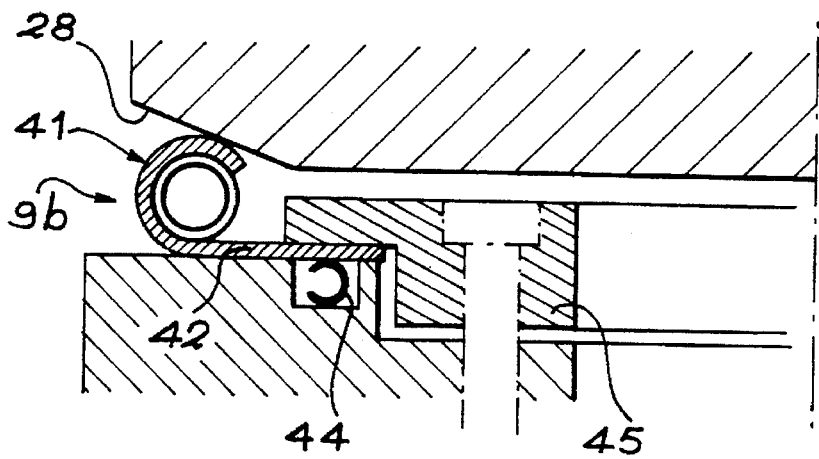

FIG. 8 shows a view of an almost similar embodiment, except the main joint 9b has a casing 41 opening inwardly and whose tongue 42 extends also towards the inside of the space surrounded by the joint 9b in the same way as the clamping flange 45 of the second joint 44 which surrounds the joint 9b. All the other comments of FIG. 7 apply to the latter. In particular, the main joint 9b ensures imperviousness against the conical bearing 28 and the second joint 44 ensures imperviousness against the flat bearing 27.

Figure 9:
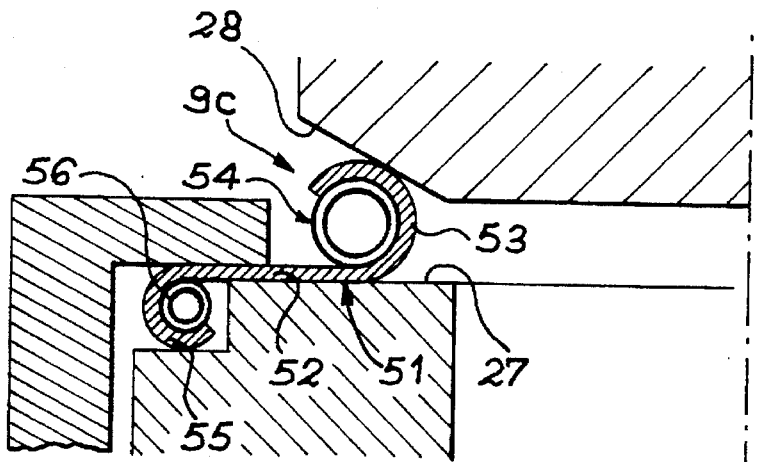

Other embodiments use a single joint to ensure imperviousness on the two bearings 27 and 28. Thus, the joint 9c of FIG. 9 includes a casing 51 composed of a tongue wound at its two opposing ends : one of the ends 53 surrounds a core 54 compressed between the bearings 27 and 28 and the other end 55 bears a core 56 compressed at the bottom of a throat by a flange, as for FIG. 7. The cores 54 and 56 thus correspond to those of the main joint 9a or 9b and respectively to the second joint 34 or 44.

Figure 10:
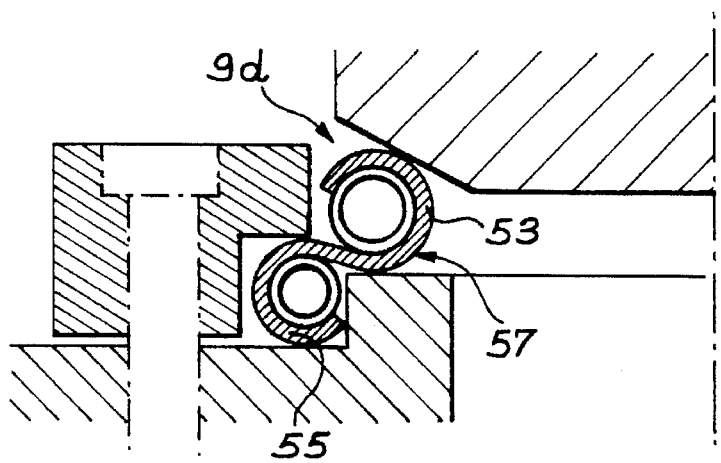

An almost similar embodiment is shown on FIG. 10 where the joint 9d has a casing 57 without the tongue 52, that is where the bent back ends 53 and 55 are contiguous or almost meet.

Figure 11:
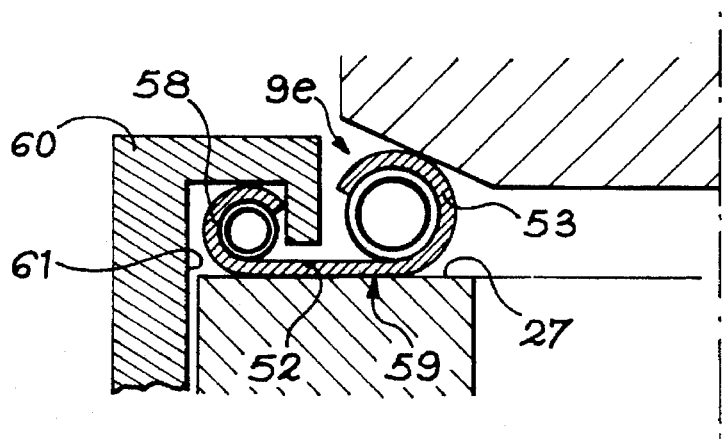

FIG. 11 describes a joint 9e which resembles the joint 9c but with a difference in that the ends 53 and in this instance 58 of the casing 59 also comprise the tongue 52 and are bent back in the same direction which avoids having to hollow a throat in the flat bearing 27. The clamping flange 60 bears a throat 61 for receiving the portion of the joint 9e including the end 58 and which ensures imperviousness against the flat bearing 27.

Figure 12:
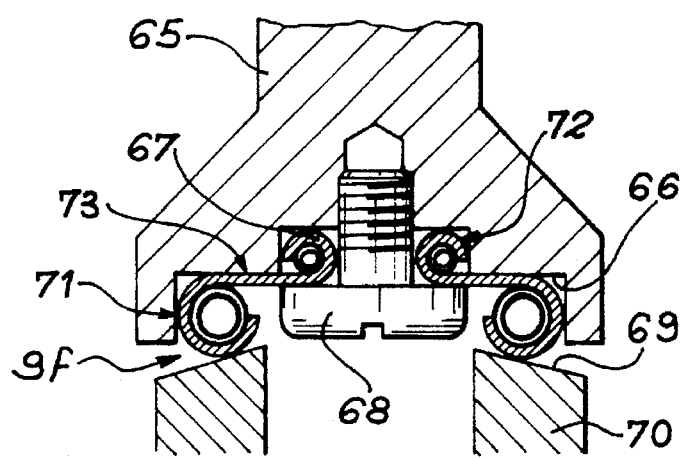

In all the preceding embodiments, the seat of the system has the flat bearing 27 and the joint rests on this bearing. Now, the roles of the seat and the clack valve may be inverted. This type of embodiment is shown on FIG. 12 where a joint 9f with a shape similar to the joint 9c is disposed on a clack valve 65 in a recess 66 provided with a central reinforcement 67. The bottom of the recess 66 forms a flat bearing for the joint 9f and the conical bearing 69 is situated on the seat 70. A portion 721 of the joint 9f (composed as elsewhere of a spring with contiguous spires surrounded by a metallic casing) is compressed between the conical bearing 69 and the bottom of the recess 66, an opposing portion 72 (composed like the preceding one) is compressed in the central reinforcement 67 by a pressure screw 68, and an intermediate portion 73 composed of a flat tongue portion of the metallic casing rests in the recess 66. The portions 71 and 72 thus ensure imperviousness against the conical bearing 69 and the surface of the central reinforcement 67 between which they respectively extend.

Figure 13:
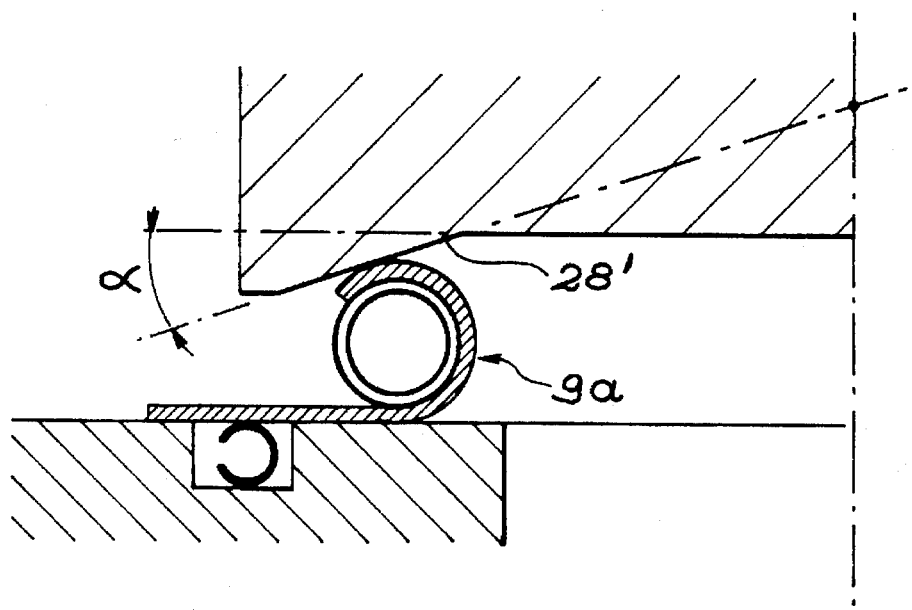
Figure 14:
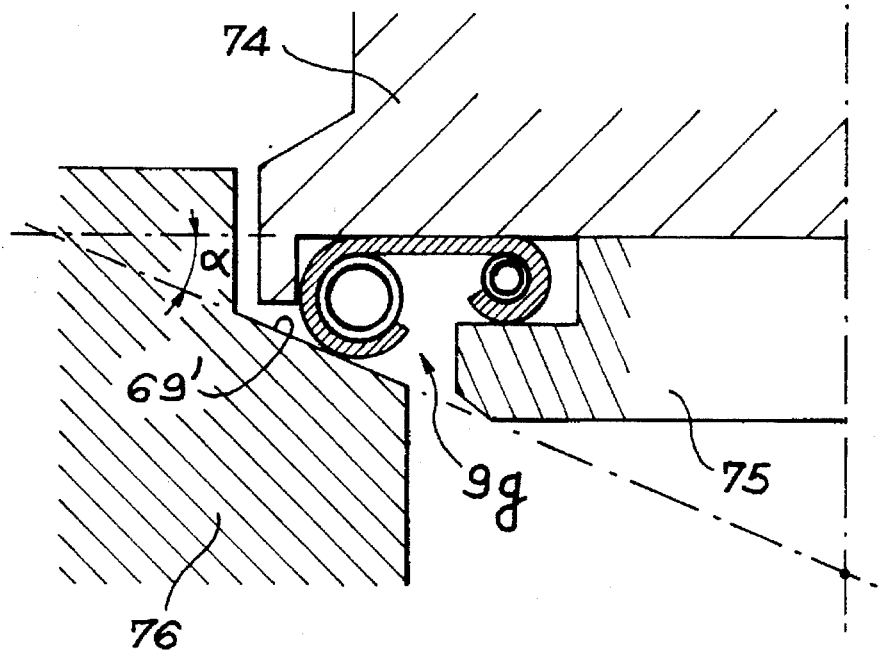

It is also possible that the angle α is not orientated so as to open outside the joint 9 as in the preceding figures, but rather inwardly. This embodiment is shown on FIG. 13 where the conical bearing 28' is therefore orientated towards the inside of the joint 9a instead of being towards the outside of the latter. This embodiment is identical to that of FIG. 7 as regards all of its other aspects and functions in the same way. Finally, the conception of FIG. 14 combines some of the preceding embodiments in that it includes a joint 9g similar via its shape to the joint 9e but is disposed differently on a clack valve, that is the static joint is surrounded by the sliding joint and screwed down by a screw 75 fixed to the clack valve 74 and the seat 76 has a conical bearing 69' orientated towards the inside of the joint 9g.

One can easily see from this example that other modes are available for combining the elements of the preceding figures.

What is claimed is:

1. Imperviousness system comprising a valve body portion having a substantially flat first bearing surface, a clack valve having a second bearing surface, and a sealing element disposed between the first and second bearing surfaces, wherein the sealing element is toric, elastic and has a metallic outer casing, and the first and second bearings form therebetween an acute angle of less than or equal to 45°.

2. System according to claim 1 wherein the value of the acute angle is directly linked to the nature of the gasket and the value of the clamping force of the clack valve.

3. System according to claim 1, wherein the joint includes an open casing extending into a tongue resting on one of the bearings.

4. System according to claim 3, wherein the tongue covers a throat hollowed in said one of the bearings on which it rests, the throat containing a static imperviousness joint, the system further comprising a flange compressing the tongue on the static joint.

5. System according to claim 4, wherein the static joint includes a casing extending the tongue.

6. System according to claim 3, wherein the tongue is extended by an open casing of a static imperviousness joint compressed on said one of the bearings on which the tongue rests via a flange.

7. System according to claim 3, wherein said one of the bearings on which the tongue rests is flat.

8. System according to claim 1, wherein the acute angle opens outside the joint.

9. System according to claim 1, wherein the acute angle opens towards the inside of the joint.

10. System according to claim 1, wherein the metallic outer casing is composed of aluminum and the angle is between about 10° to 15°.

11. System according to claim 1, wherein the metallic outer casing is composed of silver and the angle is between about 20° to 30°.

12. System according to claim 1, wherein the metallic outer casing is composed of copper and the angle is between about 25° to 35°.

13. System according to claim 1, wherein the metallic outer casing is composed of nickel and the angle is between about 30° to 40°.

14. System according to claim 1, wherein the metallic outer casing is composed of stainless steel and the angle is between about 35° to 45°.

15. Imperviousness system comprising a valve body portion having a substantially flat first bearing surface, a clack valve having a second bearing surface, and a sealing element disposed between the first and second bearing surfaces, wherein the sealing element is toric, elastic and has a metallic outer casing, and the first and second bearings form therebetween an acute angle, the sealing element comprising a tongue extending from the outer casing, one of said bearing surfaces comprising a throat formed as a recess therein, wherein the tongue is flat along a contact surface thereof which faces the throat, such that the contact surface does not enter the area of the throat.

* * * * *